United States Patent
Oden et al.

(10) Patent No.: US 9,617,913 B2
(45) Date of Patent: Apr. 11, 2017

(54) TOOL FOR MANIPULATING CROSS-FIRE TUBE IN COMBUSTOR ASSEMBLY, COMBUSTOR MAINTENANCE ASSEMBLY AND METHOD

(71) Applicant: General Electric Company, Schenectady, NY (US)

(72) Inventors: Joshua Michael Oden, Greenville, SC (US); Ulrich Werner Neumann, Simpsonville, SC (US); John William Herbold, Fountain Inn, SC (US)

(73) Assignee: General Electric Company, Schenectady, NY (US)

( * ) Notice: Subject to any disclaimer, the term of this patent is extended or adjusted under 35 U.S.C. 154(b) by 443 days.

(21) Appl. No.: 14/205,923

(22) Filed: Mar. 12, 2014

(65) Prior Publication Data

US 2015/0260096 A1 Sep. 17, 2015

(51) Int. Cl.
*F02C 3/00* (2006.01)
*F01D 25/28* (2006.01)
*F23R 3/48* (2006.01)

(52) U.S. Cl.
CPC .............. *F02C 3/00* (2013.01); *F01D 25/285* (2013.01); *F23R 3/48* (2013.01); *F05D 2230/68* (2013.01); *F05D 2230/70* (2013.01); *F05D 2230/72* (2013.01); *F23R 2900/00019* (2013.01); *Y10T 29/49718* (2015.01)

(58) Field of Classification Search
CPC ....................................................... F01D 1/00
USPC ........................................ 431/154; 29/402.01
See application file for complete search history.

(56) References Cited

U.S. PATENT DOCUMENTS

| 3,589,134 A * | 6/1971 | Hackmann | B25J 9/046 294/66.2 |
| 5,440,778 A | 8/1995 | De Guzman | |
| 8,516,711 B2 * | 8/2013 | Pettersson | B25H 1/0021 33/503 |
| 2011/0173829 A1 * | 7/2011 | Pettersson | B25H 1/0021 33/503 |

OTHER PUBLICATIONS

Related U.S. Appl. No. 13/682,965, filed Nov. 21, 2012 entitled "Super-telescoping Cross-Fire Tube and Method of Assembling a Combustor Structure".

* cited by examiner

*Primary Examiner* — Avinash Savani
(74) *Attorney, Agent, or Firm* — Dority & Manning, P.A.

(57) ABSTRACT

Combustor maintenance assemblies, tools and methods for manipulating cross-fire tubes in combustor assemblies are provided. A tool includes a base and an arm pivotally connected to the base. The arm includes an effort portion and a load portion, the load portion extendable into a passage defined by the compressor discharge casing. The tool further includes a contact member extending from the load portion to contact the cross-fire tube. The contact member includes a head end for contacting a second end of the cross-fire tube, and a joint disposed between the head end and the load portion, the joint allowing movement of the head end relative to the load portion. The arm is movable such that the contact member contacts the cross-fire tube and applies a force to the cross-fire tube generally along a longitudinal axis of the cross-fire tube.

15 Claims, 4 Drawing Sheets

TOOL FOR MANIPULATING CROSS-FIRE TUBE IN COMBUSTOR ASSEMBLY, COMBUSTOR MAINTENANCE ASSEMBLY AND METHOD

FIELD OF THE INVENTION

The present disclosure relates in general to turbomachines, such as gas turbines. In particular, the present disclosure relates to tools for manipulating cross-fire tubes in combustor assemblies of turbomachines, and to combustor maintenance assemblies including the tools and methods for manipulating cross-fire tubes in combustor assemblies.

BACKGROUND OF THE INVENTION

Turbomachines are widely utilized in fields such as power generation. For example, a conventional gas turbine system includes a compressor section, a combustor section, and at least one turbine section. The compressor section is configured to compress air as the air flows through the compressor section. The air is then flowed from the compressor section to the combustor section, where it is mixed with fuel and combusted, generating a hot gas flow. The hot gas flow is provided to the turbine section, which utilizes the hot gas flow by extracting energy from it to power the compressor, an electrical generator, and other various loads.

The combustor section of a turbomachine generally includes a combustor assembly, which includes a plurality of combustors disposed in an annular array. Each combustor is connected to and positioned within a compressor discharge casing ("CDC"). Additionally, cross-fire tubes extend transversely between the combustors. Accordingly, during startup, ignition of each individual combustor is not required. Rather, ignited flames from one or more combustor may flow through cross-fire tubes to neighboring combustors to ignite these combustors.

In previously known combustor assemblies, the cross-fire tubes were located outside of a plenum generally defined by the CDC and turbine casing. More recently, however, the cross-fire tubes have been moved downstream along the combustors into the plenum. This design change provides various advantages during start-up and operation of combustor assembly. However, the design change also introduces challenges during, for example, combustor assembly maintenance. For example, to remove a combustor from the combustor assembly, the cross-fire tubes associated with that combustor must first be removed from the combustor so that they no longer extend past the shells defining the combustor into the interior of the combustor. The combustor can then be removed from the CDC. However, in cases wherein the cross-fire tubes are in the plenum, access to the cross-fire tubes is limited or unavailable. Accordingly, presently known approaches to removing these combustors are time-consuming and burdensome.

Accordingly, improved methods and apparatus for manipulating cross-fire tubes in combustor assemblies are desired. In particular, methods and apparatus that facilitate easy and efficient manipulation of cross-fire tubes relative to the associated combustors would be advantageous.

BRIEF DESCRIPTION OF THE INVENTION

Aspects and advantages of the invention will be set forth in part in the following description, or may be obvious from the description, or may be learned through practice of the invention.

In accordance with one embodiment of the present disclosure, a combustor maintenance assembly for a combustor assembly is provided. The combustor maintenance assembly includes a compressor discharge casing defining a plurality of passages disposed in an annular array, each of the plurality of passages comprising an inlet. The compressor discharge casing further includes a plurality of inlet flanges each defining the inlet of one of the plurality of passages. The combustor maintenance assembly further includes a cross-fire tube comprising a first tube and a second tube movable along a longitudinal axis relative to the first tube, the first tube comprising a first end and the second tube comprising a second end. The combustor maintenance assembly further includes a tool. The tool includes a base and an arm pivotally connected to the base. The arm includes an effort portion and a load portion, the load portion extending into one of the plurality of passages. The tool further includes a contact member extending from the load portion to contact the cross-fire tube. The contact member includes a head end for contacting the second end of the cross-fire tube, and a joint disposed between the head end and the load portion, the joint allowing movement of the head end relative to the load portion. The arm is movable such that the contact member contacts the cross-fire tube and applies a force to the cross-fire tube generally along the longitudinal axis of the cross-fire tube.

In accordance with another embodiment of the present disclosure, a tool for manipulating a cross-fire tube in a combustor assembly is provided. The tool includes a base and an arm pivotally connected to the base. The arm includes an effort portion and a load portion, the load portion extendable into a passage defined by a compressor discharge casing of the combustor assembly. The tool further includes a contact member extending from the load portion to contact the cross-fire tube. The contact member includes a head end for contacting a second end of the cross-fire tube, and a joint disposed between the head end and the load portion, the joint allowing movement of the head end relative to the load portion. The arm is movable such that the contact member contacts the cross-fire tube and applies a force to the cross-fire tube generally along a longitudinal axis of the cross-fire tube.

In accordance with another embodiment of the present disclosure, a method for manipulating a cross-fire tube in a combustor assembly is provided. The method includes connecting a flange of a tool to an inlet flange of a compressor discharge casing of the combustor assembly, and positioning an arm of the tool such that a load portion of the arm extends within a passage defined by the compressor discharge casing. The method further includes pivoting the arm such that a contact member extending from the load portion contacts a second end of the cross-fire tube, and moving a second tube of the cross-fire tube from a first position towards a first tube of the cross-fire tube to a second position, the second tube comprising the second end.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a schematic view of a gas turbine in accordance with one embodiment of the present disclosure.

DETAILED DESCRIPTION OF THE INVENTION

Figure 1:
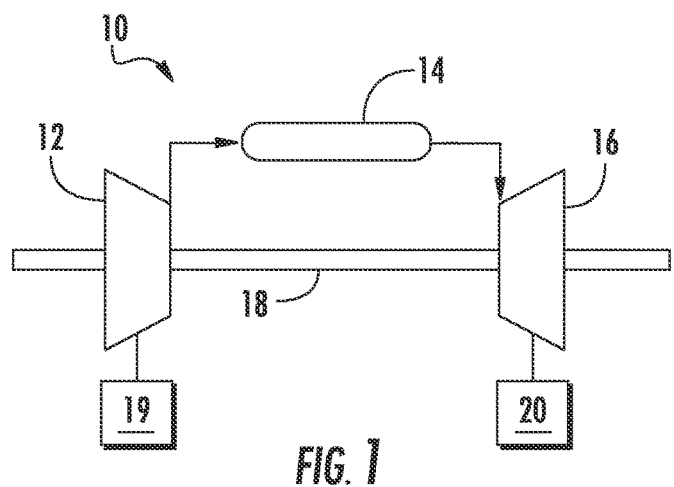

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a schematic diagram of a turbomachine, which in the embodiment shown is a gas turbine system 10. It should be understood that the turbomachine of the present disclosure need not be a gas turbine system 10, but rather may be any suitable turbine system or other turbomachine, such as a steam turbine system or other suitable system. The system 10 as shown may include a compressor section 12, a combustor section 14 which may include a plurality of combustors 15 as discussed below, and a turbine section 16. The compressor section 12 and turbine section 16 may be coupled by a shaft 18. The shaft 18 may be a single shaft or a plurality of shaft segments coupled together to form shaft 18. The shaft 18 may further be coupled to a generator or other suitable energy storage device, or may be connected directly to, for example, an electrical grid. An inlet section 19 may provide an air flow to the compressor section 12, and exhaust gases may be exhausted from the turbine section 16 through an exhaust section 20 and exhausted and/or utilized in the system 10 or other suitable system. Exhaust gases from the system 10 may for example be exhausted into the atmosphere, flowed to a steam turbine or other suitable system, or recycled through a heat recovery steam generator.

Figure 2:
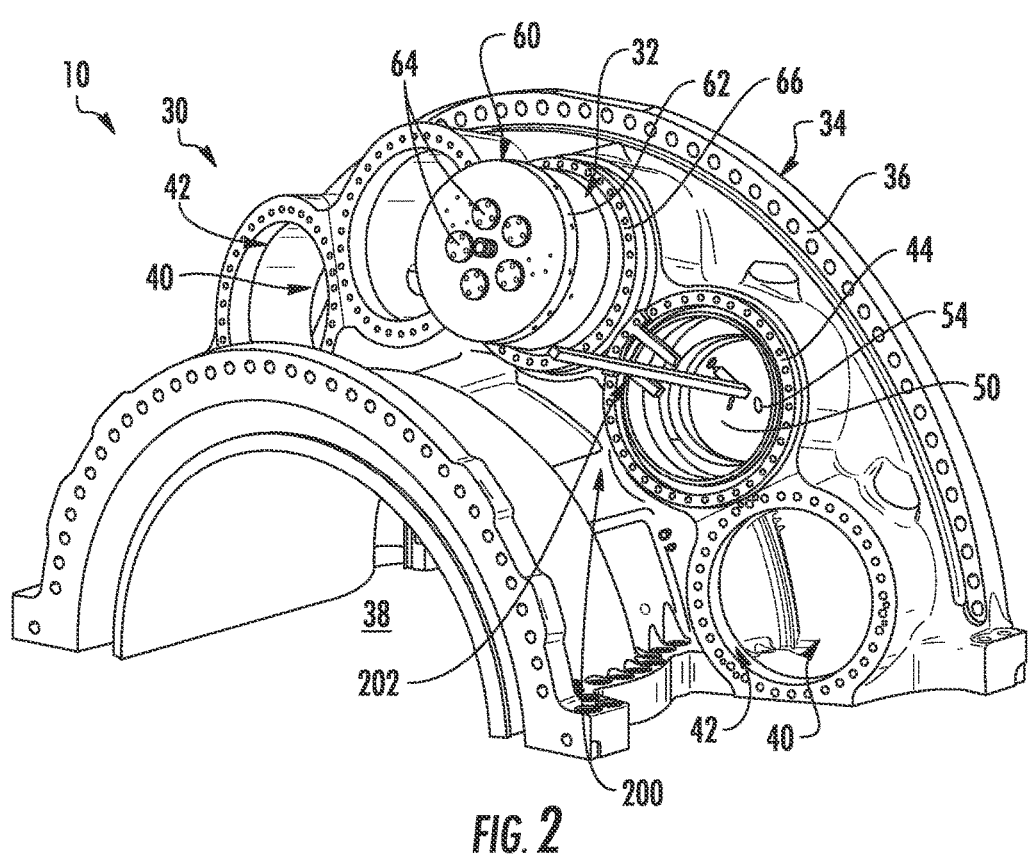
FIG. 2 provides a perspective view of a portion of a combustor assembly and tool in accordance with one embodiment of the present disclosure.
Figure 3:
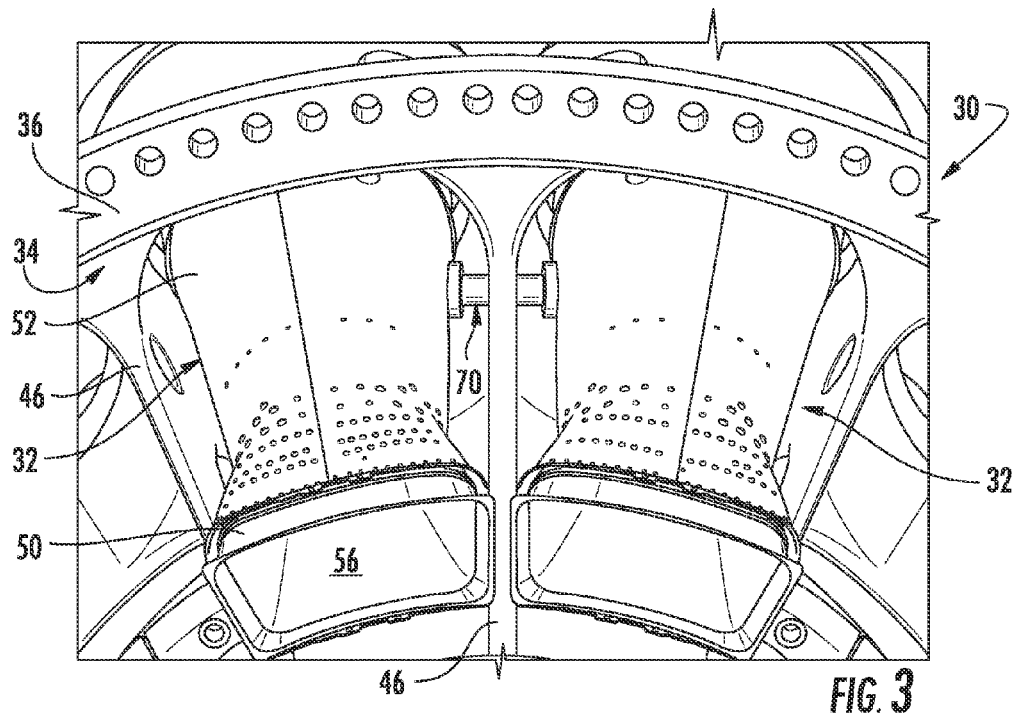
FIG. 3 provides a perspective view of neighboring combustors in a CDC in accordance with one embodiment of the present disclosure.
Figure 4:
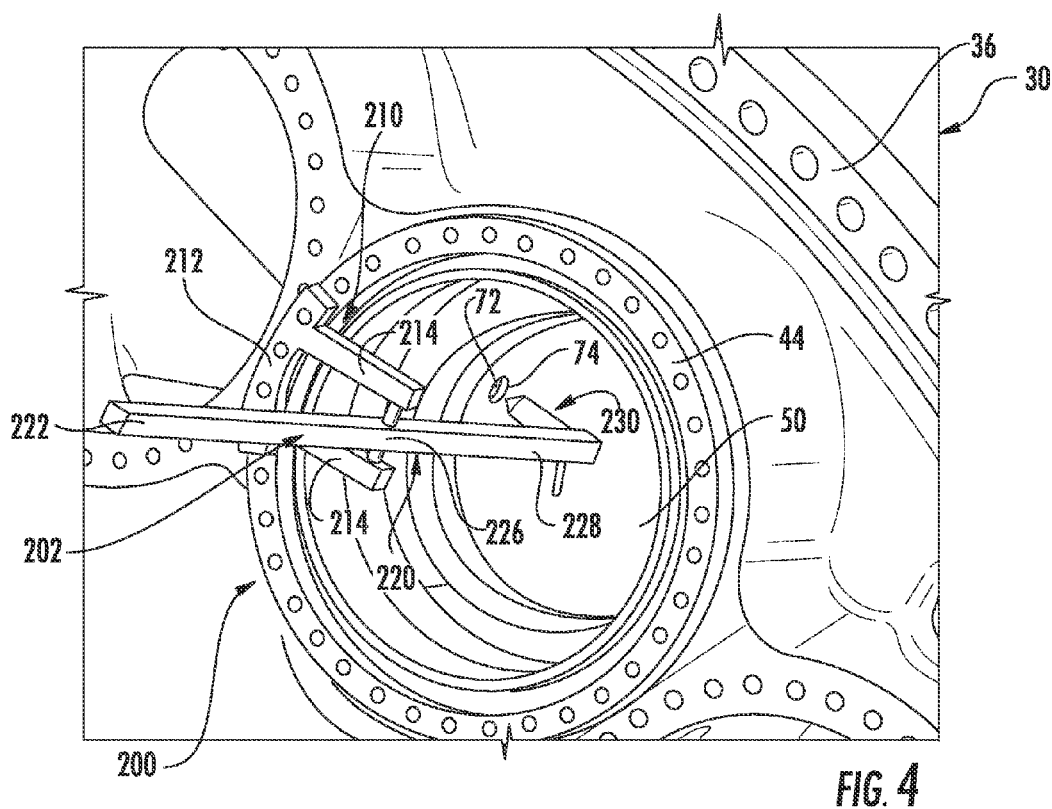
FIG. 4 provides a perspective view of a tool connected to a CDC in accordance with one embodiment of the present disclosure.

Referring now to FIGS. 2 through 4, a combustor section 14 of a turbomachine may include a combustor assembly 30. The combustor assembly 30 may generally include a plurality of combustors 32, which may be generally disposed in an annular array. The combustor assembly 30 may further include a compressor discharge casing ("CDC") 34. The combustors 32 may generally be connected to the CDC 34.

The CDC 34 may include a main flange 36 which may connect to a mating flange of a turbine casing (not shown). A plenum 38 may be at least partially defined by the CDC 34 and CDC, through which working fluid may flow from the compressor section 12 to the combustors 32. A portion of the working fluid may be utilized to cool the combustors. Working fluid further may be combusted within each combustor 32, and the resulting hot gases of combustion may flow from the combustors to the turbine section 16.

The CDC 34 may further define a plurality of passages 40, which may be disposed in an annular array. Each combustor 32 may be positioned at least partially within one of the plurality of passages 40. Each passage 40 may include an inlet 42, as illustrated. The CDC 34 may further include a plurality of inlet flanges 44, each of which may define one of the plurality of inlets 42. Additionally, the CDC 34 may include a plurality of walls 46. The walls may be disposed in an annular array, each wall between and dividing and defining neighboring passages 40. The walls 46 may generally extend from between the inlets 42 downstream towards the turbine section 16.

A combustor 32 according to the present disclosure may include an inner sleeve 50, which may be referred to as a combustor liner, and an outer sleeve 52, which may be referred to as an impingement sleeve. The inner and outer sleeves 50, 52 may each be formed form a single component or multiple sections. The outer sleeve 52 may generally surround the inner sleeve 50, an a portion of the working fluid in the plenum 38 may flow through apertures 54 defined in the outer sleeve 52 and then flow upstream towards the inlets 42 between the inner and outer sleeves 50, 52, cooling the inner sleeve 50. Hot gases of combustion may flow downstream towards the turbine section 16 through an interior 56 of the inner sleeve 50.

A combustor 32 may further include an end cap assembly 60, which may include an end cap 62, one or more fuel nozzles 64 extending through the end cap 62, and a mating flange 66 connectable to the inlet flange 44 to connect the end cap assembly 60 with the sleeves 50, 52, etc. Fuel may be provided through the fuel nozzles 64 for mixing with the working fluid and combustion within the combustor 32 to produce hot gases of combustion.

A plurality of cross-fire tubes 70 may additionally be provided in combustor assembly 30. Each cross-fire tube 70 may extend generally transversely between neighboring combustors 32. Ends of the cross-fire tubes 70 may extend through holes 72 defined in the outer sleeve 52. Holes 74 may additionally be defined in the inner sleeve 54 to facilitate communication between the cross-fire tubes 70 and the combustor interiors 56, and the ends of the cross-fire tubes 70 may additionally extend through these holes 74.

Figure 6:
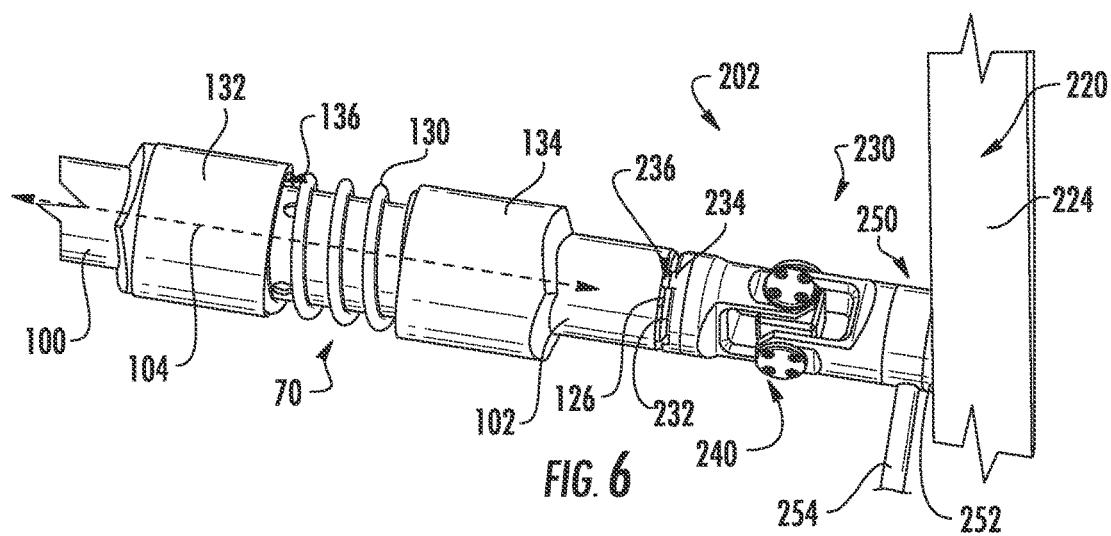
FIG. 6 provides a perspective view of a tool in contact with a cross-fire tube in accordance with one embodiment of the present disclosure.
Figure 7:
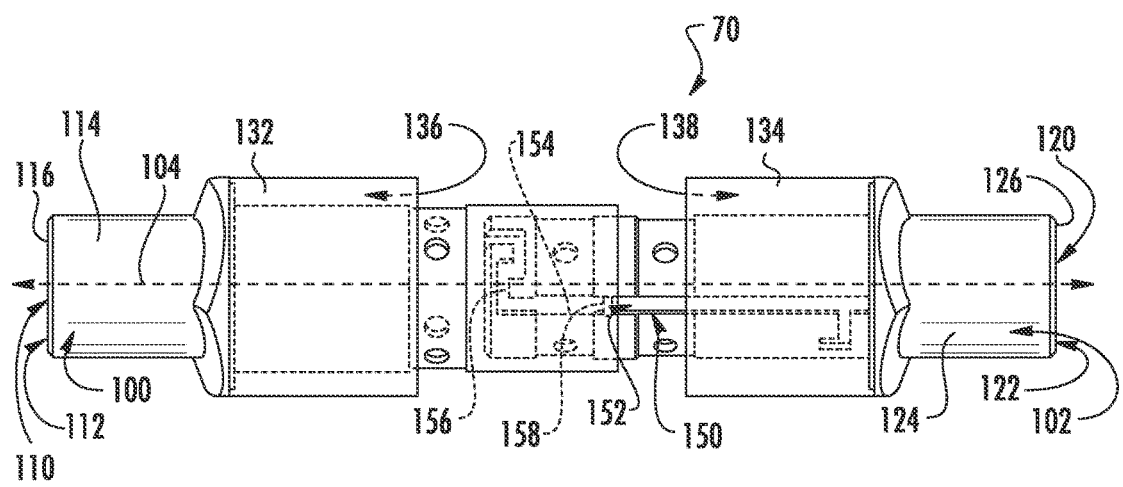
FIG. 7 provides a perspective view of a cross-fire tube in accordance with one embodiment of the present disclosure.

Referring now to FIGS. 6 and 7, cross-fire tubes 70 in accordance with embodiments of the present disclosure are illustrated. A cross-fire tube 70 may include, for example, a first tube 100 and a second tube 102. The first tube 100 may define a first passage 110 therethrough. The first tube 100 may further include an inner surface 112 and an outer surface 114, and may define a first end 116 of the cross-fire tube 70. The second tube 102 may define a second passage 120 therethrough. The second tube 102 may further include an inner surface 122 and an outer surface 124, and may define a second end 126 of the cross-fire tube 70.

The tubes 100, 102 may be movable relative to each other, such as along a longitudinal axis 104 of the cross-fire tube 70. For example, the second tube 102 may be movable relative to the first tube 100 between a first position (as illustrated in FIG. 7) and a second position (as illustrated in FIG. 6). In the first position, the second end 126 is spaced from the first end 116 relative to in the second position. In the second position, the second end 126 is thus closer to the first end 116 than in the first position.

Further, in some embodiments, cross-fire tube 70 may further include a biasing element 130, which may for example and as illustrated be a compression spring. The biasing element 130 may bias the tubes 100, 102 relative to each other, such as along the longitudinal axis 104. For example, the biasing element 130 may bias the tubes 100, 102 away from each other, such as towards the first position.

As illustrated, cross-fire tube 70 may further include a first outer shell 132 surrounding the first tube 100 and a second outer shell 134 surrounding the second tube 102. An outer channel 136 may be defined between the first outer shell 132 and first tube 100, and an outer channel 138 may be defined between the second outer shell 134 and the second tube 102. Portions of the biasing element 130 may be disposed within each channel 136, 138 to anchor the biasing element 130 between the tubes 100, 102.

Referring now to FIG. 7, a cross-fire tube 70 may further include a locking assembly 150 for locking the first and second tubes 100, 102 together in a particular position, such as in the second position. For example, when the second tube 102 is moved towards the first tube 100 to the second position, the locking assembly 150 may be engaged to lock the first and second tubes 100, 102 in this position.

A locking assembly 150 according to the present disclosure may, for example, include a groove 152 defined in one of the first and second tubes 100, 102, such as the first tube 100 as illustrated. In particular, the groove 152 may be defined in the outer surface 114 of the first tube 100. The groove 152 may include a longitudinally extending portion 154, which may extend generally along the longitudinal axis 104, and a locking portion 156, which may for example, extend from the longitudinally extending portion 154 generally circumferentially or in another suitable direction about the tube 100. The locking assembly 150 may further include a tab 158, which may extend from the other of the first and second tubes 100, 102, such as from the second tube 102 as illustrated. In particular the tab 158 may extend from the inner surface 122 into the second passage 120. The tab 158 may further be slidable within the groove. For example, when the second tube 102 is moved towards the first tube 100 to the second position, the tab 158 may slide within the longitudinally extending portion 154. When the second tube 102 is in the second position, the tube 102 may be rotatable such that the tab 158 slides from the longitudinally extending portion 154 into the locking portion 156. When in the locking portion 156, the tab 158 is prevented from moving longitudinally, thus locking the second tube 102 in the second position until the tube 102 is rotated in the opposite direction to move the tab 158 back into the longitudinally extending portion 154.

The present disclosure is further directed to combustor maintenance assemblies 200. As illustrated in FIGS. 2 and 4, a combustor maintenance assembly 200 includes for example various components of a combustor assembly 30, such as a CDC 34 and a cross-fire tube 70 which may extend between neighboring combustors 32. The combustor maintenance assembly 200 may further include a tool 202 for manipulating the cross-fire tube 70.

Figure 5:
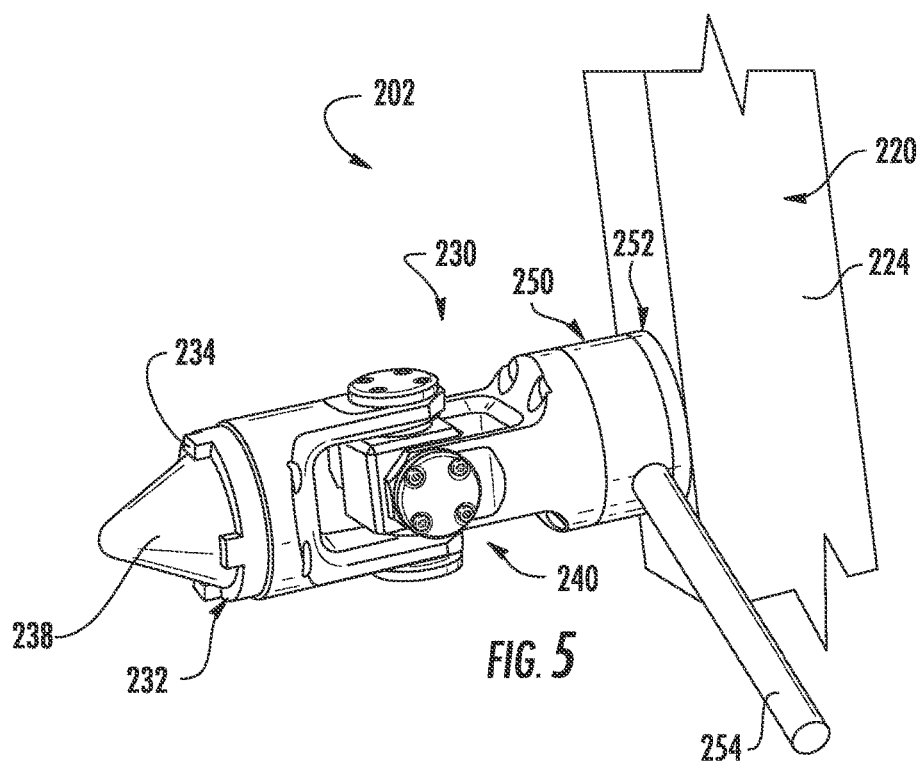
FIG. 5 provides a perspective view of a contact member of a tool in accordance with one embodiment of the present disclosure.

Referring to FIGS. 2 and 4 as well as FIGS. 5 and 6, a tool 202 according to the present disclosure includes various components which facilitate easy and efficient manipulation of cross-fire tubes 70. Such manipulation may advantageously allow efficient removal and replacement of combustors 32 without requiring removal of neighboring combustors 32. A tool 202 may include, for example, a base 210. The base 210 may include a flange 212 which is connectable to an inlet flange 44 of the CDC 34. The flange 212 may, for example, be generally arcuate, and may include a plurality of bore holes which align with bore holes of the inlet flange 44. Mechanical fasteners, such as nut/bolt combinations, may extend through the aligned bore holes to connect the flange 212 to the inlet flange 44. The base 210 may further include one or more legs 214 extending from the flange 212.

Alternatively, the flange 212 or base 210 generally may be otherwise connected to the inlet flange 44, such as through the use of clamps or other suitable mounting apparatus. In further alternative embodiments, it should be understood that the base 210 need not be connected to an inlet flange 44, and rather may be connected to any suitable component of the combustor assembly 30.

Tool 202 may further include an arm 220 pivotally connected to the base 210, such as to one or more legs 214 of the base 210. The arm 220 may include an effort portion 222 and a load portion 224, which may be distinguished by a pivot point 226 at which the arm 220 is pivotally coupled. The arm 220 may thus pivot with respect to the base 210. For example, a user may move the effort portion 222 back and forth, and the load portion 224 may pivotally move in response to this movement. When the tool 202 is connected to the inlet flange 44, the load portion 224 may move generally towards and away from the cross-fire tube 70 in response to movement of the effort portion 222 by a user. The load portion 224 may be extendable into a passage 40 defined by the CDC 34, such as the passage 40 associated with the flange 212 to which the base 210 is connected. The load portion 224 may thus extend into the interior 56 of the associated combustor 32 when the combustor 32 is connected in the passage 40.

A tool 202 may further include a contact member 230. The contact member 230 may be provided for contacting the cross-fire tube 70 and transferring forces from the tool 202 to the cross-fire tube 70 to manipulate the cross-fire tube 70. Contact member 230 may extend from the load portion 224 to contact the cross-fire tube 70. Referring to FIGS. 5 and 6, contact member 230 may include a head end 232. The head end 232 may contact the second end 126 of the cross-fire tube 70. Forces from the tool 202 may be transferred to the cross-fire tube 70 through this contact. In exemplary embodiments, the head end 232 may be generally annular, such as circular, and may have a diameter approximately equal to a diameter of the second end 126. Further, in some embodiments, one or more tabs 234 may extend from the head end 232. Each tab 234 may be matable with a slot 236 defined in the second end 126. Insertion of the tabs 234 into mating slots 236 may properly position and orient the head end 232 relative to the cross-fire tube 70. Additionally, various forces may be transferred from the tool 202 to the cross-fire tube 70 through the tabs 234.

The tool 202 may, in some embodiments, further include a guide feature 238 extending from the head end 232. The guide feature 238 may be operable to locate the head end 232 relative to the second end 126 of the cross-fire tube 70. For example, in some embodiments, the guide feature 238 may be a generally cone-shaped protrusion. When the contact member 230 is moving towards the second end 126, the tip of this protrusion may initially interact with the cross-fire tube 70 by being inserted in the second passage 120. The conical shape of the protrusion may then locate the head end 232 relative to the second end 126 as the contact member 230 continues moving towards the second end 126, such that the head end 232 contacts the second end 126 at a proper location as illustrated.

The tool 202 may further include a joint 240. The joint 240 may be disposed between the load portion 224 and the head end 232, and may movably couple the head end 232 and load portion 224 such that the movement of the head end 232 relative to the load portion 224 is allowed. In exemplary embodiments, the joint 240 is a universal joint, which may allow rotation of the head end 232 relative to the load portion 224 about three axes. Alternatively, any suitable joint, such as a joint allowing rotation about only one axis or two axes, may be utilized.

The contact member 230 generally may additionally, in some embodiments, generally be rotatable relative to the load portion 224. For example, contact member 230 may include a base 250 which may be rotatable relative to the load portion 224. The base 250 may be positioned between the joint 240 and the load portion 224. The joint 240 may, for example, be fixedly connected to the base 250, such that rotation of the base 250 rotates the joint 240 and the head end 232. As illustrated, in some embodiments, a bearing 252, such as a ball bearing assembly, may be included between the base 250 and the load portion 224 to facilitate rotation of the base 250.

Further, in some embodiments, the contact member 230 may include a handle 254, which may extend from the base 250. Handle 254 may facilitate user-initiated rotation of the contact member 230. A user may thus grasp and move the handle 254, rotating the base 250 and thus the contact member 230 generally relative to the load portion 224.

The arm 220 may be movable, as discussed, such that the contact member 230 contacts the cross-fire tube 70, such as the second end 126 thereof, and applies a force to the cross-fire tube 70. Such force may be applied generally along the longitudinal axis 104 of the cross-fire tube 70. Such force may generally move the second tube 102 from the first position towards the second position, advantageously causing the tube 70 to no longer extend through the holes 72, 74 defined in the sleeves 52, 50 of the combustor 32. This may allow the combustor 32 to then be removed as required for, for example, maintenance or replacement.

Further, the contact member 230 may be rotatable to apply a rotational force to the second end 126 and second tube 102. This force may advantageously be applied by a user using, for example, the handle 254, when the second tube 102 is in the second position. Rotation, transferred for example through the tabs 234 and slots 236, may cause the tab 158 to slide into the locking assembly 150, locking the cross-fire tube 70 in the second position. This allows the combustor 32 to be removed without concern that the cross-fire tube 70 will unexpectedly revert to the first position.

It should generally be understood that such movements may be reversible to move the cross-fire tube 70 to the first position after combustor 32 is reinstalled.

The present disclosure is further directed to methods for manipulating a cross-fire tube 70. A method may include, for example, connecting a flange 212 of a tool 202 to an inlet flange 44 of a CDC 34 of a combustor assembly 30, as discussed above. A method may further include, for example, positioning an arm 220 of the tool 202 such that a load portion 224 of the arm 220 extends within a passage 40 defined by the CDC 34. A method may further include, for example, pivoting the arm 220 such that a contact member 230 extending from the load portion 224 contacts a second end 126 of the cross-fire tube 70. A method may further include, for example, moving a second tube 102 of the cross-fire tube 70 from a first position towards a first tube 100 of the cross-fire tube to a second position, the second tube 102 comprising the second end 126. In some embodiments, the moving step includes compressing a biasing element 130 of the cross-fire tube 70.

In exemplary embodiments, in the first position the second end 126 extends through a hole 72 defined in an outer sleeve 52 of a combustor 32 disposed within the passage 40, and in the second position the second end 126 is spaced from the outer sleeve 52 and the hole 72 thereof.

In some embodiments, a method may further include, for example, the step of inserting a tab 234 of the contact member 230 into a slot 236 defined in the second end 126 of the cross-fire tube 70. Further, in some embodiments, a method may include, for example, locking the second tube 102 in the second position. The locking step may, for example, include rotating the second tube 102 about a longitudinal axis 104 of the cross-fire tube 70 relative to the first tube 100.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A tool for manipulating a cross-fire tube in a combustor assembly, the tool comprising:
    a base;
    an arm pivotally connected to the base, the arm comprising an effort portion and a load portion, the load portion extendable into a passage defined by a compressor discharge casing of the combustor assembly; and
    a contact member extending from the load portion to contact the cross-fire tube, the contact member comprising:
        a head end for contacting a second end of the cross-fire tube;
        a joint disposed between the head end and the load portion, the joint allowing movement of the head end relative to the load portion; and
        a guide feature extending from the head end, the guide feature operable to locate the head end relative to the second end of the cross-fire tube,
    wherein the arm is movable such that the contact member contacts the cross-fire tube and applies a force to the cross-fire tube generally along a longitudinal axis of the cross-fire tube.

2. The tool of claim 1, wherein the head end comprises a tab matable with a slot defined in the second end of the cross-fire tube.

3. The tool of claim 1, wherein the joint is a universal joint allowing rotation of the head end about three axes.

4. The tool of claim 1, wherein the contact member is rotatable relative to the load portion.

5. The tool of claim 4, wherein the contact member further comprises a base, the base rotatable relative to the load portion.

6. The tool of claim 5, wherein the contact member further comprises a handle extending from the base.

7. A tool for manipulating a cross-fire tube in a combustor assembly, the tool comprising:
a base;
an arm pivotally connected to the base, the arm comprising an effort portion and a load portion, the load portion extendable into a passage defined by a compressor discharge casing of the combustor assembly; and
a contact member extending from the load portion to contact the cross-fire tube, the contact member comprising:
a head end for contacting a second end of the cross-fire tube; and
a joint disposed between the head end and the load portion, the joint allowing movement of the head end relative to the load portion, wherein the joint is a universal joint allowing rotation of the head end about three axes;
wherein the arm is movable such that the contact member contacts the cross-fire tube and applies a force to the cross-fire tube generally along a longitudinal axis of the cross-fire tube.

8. The tool of claim 7, wherein the head end comprises a tab matable with a slot defined in the second end of the cross-fire tube.

9. The tool of claim 7, wherein the contact member is rotatable relative to the load portion.

10. The tool of claim 9, wherein the contact member further comprises a base, the base rotatable relative to the load portion.

11. The tool of claim 7, wherein the contact member further comprises a handle extending from the base.

12. A tool for manipulating a cross-fire tube in a combustor assembly, the tool comprising:
a base;
an arm pivotally connected to the base, the arm comprising an effort portion and a load portion, the load portion extendable into a passage defined by a compressor discharge casing of the combustor assembly; and
a contact member extending from the load portion to contact the cross-fire tube, the contact member rotatable relative to the load portion, the contact member comprising:
a head end for contacting a second end of the cross-fire tube; and
a joint disposed between the head end and the load portion, the joint allowing movement of the head end relative to the load portion;
wherein the arm is movable such that the contact member contacts the cross-fire tube and applies a force to the cross-fire tube generally along a longitudinal axis of the cross-fire tube.

13. The tool of claim 12, wherein the head end comprises a tab matable with a slot defined in the second end of the cross-fire tube.

14. The tool of claim 12, wherein the contact member further comprises a base, the base rotatable relative to the load portion.

15. The tool of claim 12, wherein the contact member further comprises a handle extending from the base.

* * * * *